L. LOMANDO.
CONVEYER CHAIN.
APPLICATION FILED FEB. 19, 1920.
1,373,010.
Patented Mar. 29, 1921.
2 SHEETS—SHEET 2.
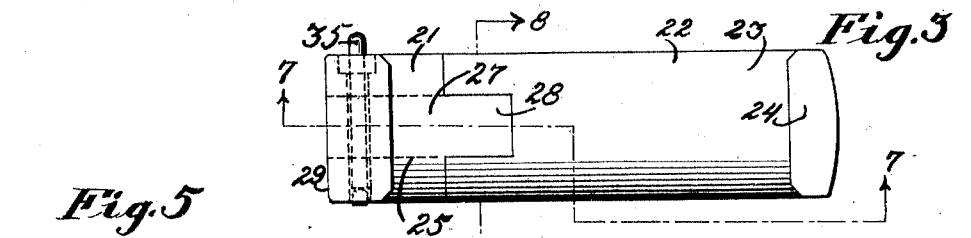
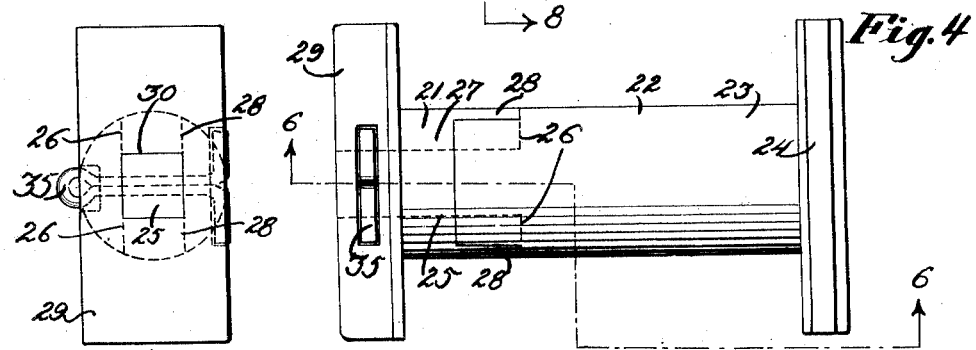
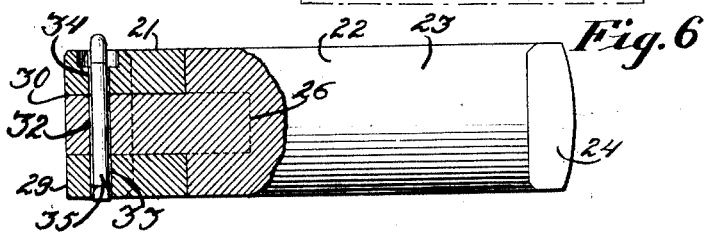
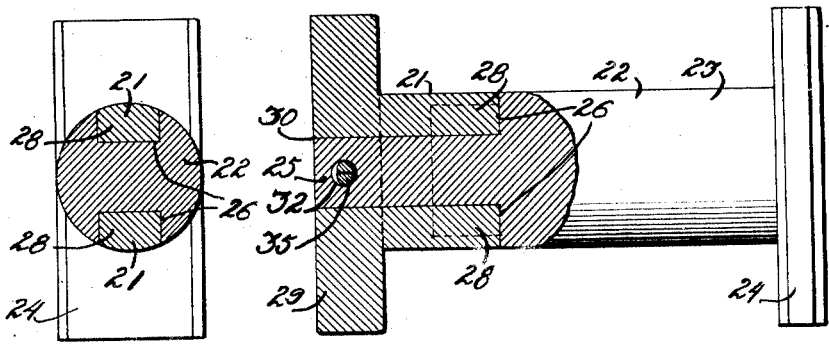
Witnesses
Geo. A. Gruss
Augustus B. Copper
Inventor
Lewis Lomando
By Joshua R. H. Potts
his Attorney

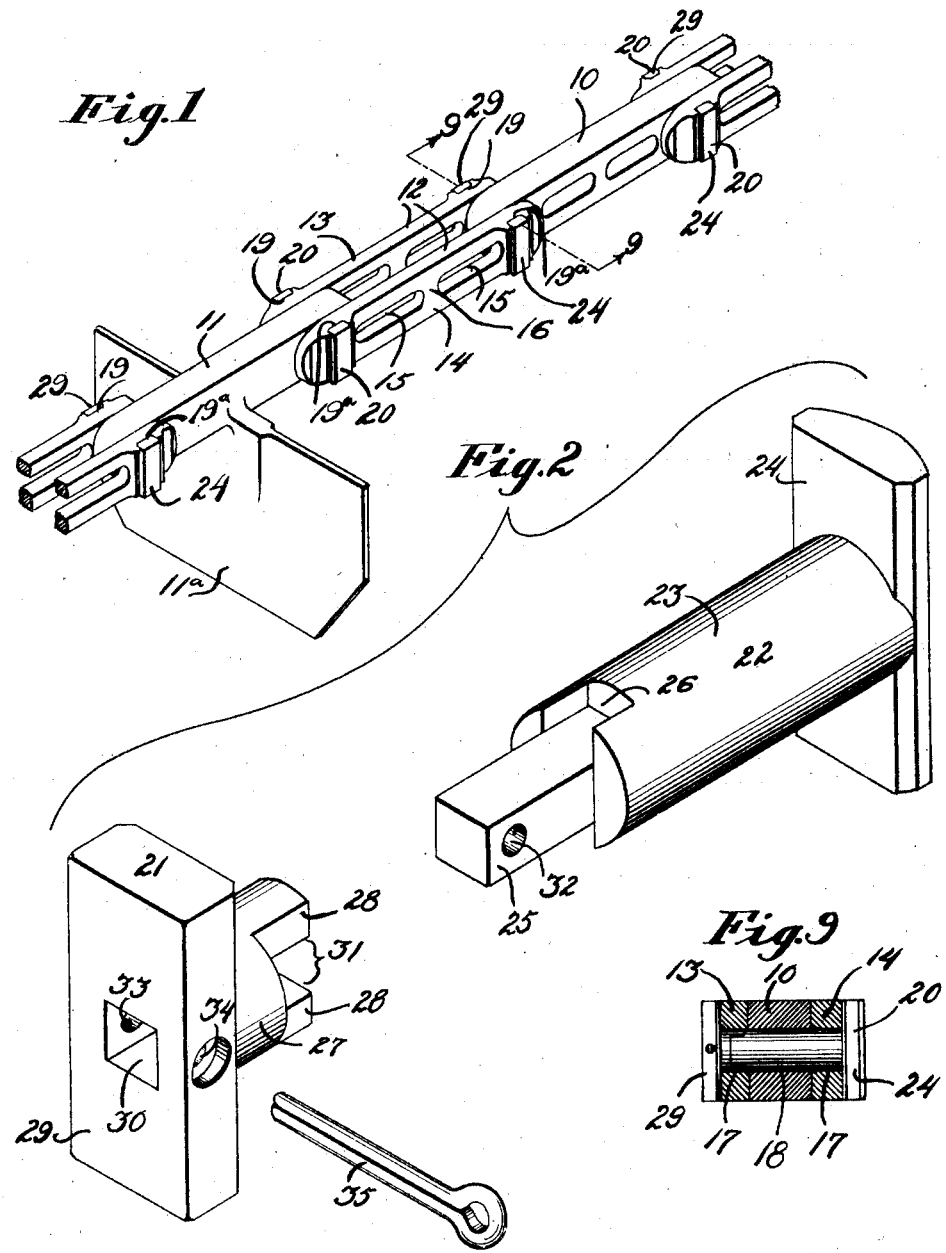

UNITED STATES PATENT OFFICE.

LEWIS LOMANDO, OF HAZLETON, PENNSYLVANIA.

CONVEYER-CHAIN.

1,373,010.  Specification of Letters Patent.  Patented Mar. 29, 1921.

Application filed February 19, 1920. Serial No. 359,926.

*To all whom it may concern:*

Be it known that I, LEWIS LOMANDO, a citizen of the United States, residing at Hazleton, in the county of Luzerne and State of Pennsylvania, have invented certain new and useful Improvements in Conveyer-Chains, of which the following is a specification.

In coal breakers and in numerous other places where large and heavy conveyer chains are employed it often occurs that the chains or conveyer flights or scrapers on the chains break and prior to my present invention it required a long time to repair or replace the broken parts of the chain. The chain structure usually included links which had to be drawn together with a mechanical means in order to permit the connecting pins to be inserted after their heads had been projected through slots in the adjoining links and afterward these connecting pins were turned into their proper positions. Furthermore the links containing the conveyer flights or scrapers were made up by securing side plates to the slotted links; said side plates being bolted to the sides of the link and having separate lugs to which the flights were attached. The repair of conveyer chains of the above type necessitated a laborious operation and as previously stated required a long time to make the repair.

One object of my present invention is to provide a conveyer chain which will be so constructed that the individual links thereof can be easily removed and replaced and so that the flights can easily be removed, replaced or reversed when occasion demands.

A further object is to make my invention of a simple and durable construction.

These objects, and other advantageous ends which will be described hereinafter, I attain in the following manner, reference being had to the accompanying drawings in which—

Figure 1 is a perspective view of a portion of a conveyer chain made in accordance with my invention, Fig. 2 is a detached perspective view of one of the link connecting pins which forms a part of my invention, Fig. 3 is a top plan view of said connecting pin, Fig. 4 is a front elevation of Fig. 3, Fig. 5 is an end view of Fig. 4, Fig. 6 is a partial sectional plan view taken on the line 6—6 of Fig. 4, Fig. 7 is a partial sectional elevation taken on the line 7—7 of Fig. 3, Fig. 8 is a transverse section taken on the line 8—8 of Fig. 3, and Fig. 9 is a transverse section taken on the line 9—9 of Fig. 1.

Referring to the drawings, my improved chain includes one-piece links 10, certain of which, such for example as the link 11, has conveying flights or scrapers 11$^a$ thereon which may be made integral therewith. The links 12, which alternate with the links 10, are made in two separate sections 13 and 14; said sections preferably having slots 15 which are separated to provide intervening webs 16 to prevent compression of the top and bottom portions of the link. The sections 13 and 14 of the links 12 have their opposite ends overlapping the ends of the links 10 and holes 17 in the sections 13 and 14 register with holes 18 in the ends of the links 10. The holes 17 in the sections 13 and 14 lead to cavities 19 and 19$^a$ in the outer faces of said sections 13 and 14. These cavities 19 and 19$^a$ are in the form of channels angular in cross section and which extend in the direction of the height of the sections 13 and 14.

Connecting pins 20 are each made in two sections 21 and 22. The section 22 has a cylindrical portion 23 which is provided with a laterally extending head 24; said head being adapted to fit within the channel 19$^a$ at each end of the section 14; it being noted that the links 10 and 12 are pivotally connected by said connecting pins 20. The end of the connecting pin section 22 which is opposite the head 24 is provided with a tenon 25 which is angular in cross section and extends in the direction of the axis of the cylindrical portion 23. This tenon is of smaller cross sectional area than the cylindrical portion 23 and recesses 26 are provided at positions diametrically opposite each other in the cylindrical portion 23; said recesses extending downwardly to the tenon 25 as clearly shown in Fig. 4. The connecting pin section 21 has a cylindrical portion 27 of the same diameter as the cylindrical portion 23 of the connecting pin of the section 22 and two jaws 28 are separated and project inwardly from the cylindrical portion 24. The opposite end of the portion 27 is provided with a laterally extending head 29 which is angular in cross section and a mortise 30 extends through the head 29 and cylindrical portion 27 in alinement with the space 31 between the jaws 28. This mortise 30 is angular in cross section and is of such size that when the connecting pin sections 21 and 22 are moved together the tenon 25 will extend through the space 31 and fit within the mortise 30. The jaws 22, when the sections 21 and 22 are thus moved together, will fit within the recesses 26 and the outer surface of the cylindrical portion 27 will be flush with the outer surface of the cylindrical portion 23. The tenon 25 has a hole 32 extending therethrough and the head 29 has alined holes 33 and 34 which, when the tenon is within the mortise, will be in register with the hole 32. A cotter pin 35 can then be inserted through the holes 32, 33 and 34 and thus lock the sections 21 and 22 together. The heads 29 of the sections 21 are adapted to fit within the cavities 19 of the link sections 13 and the connecting pins extending through the holes 17 and 18 will pivotally secure the links 10 and 12 together.

When it is desired to remove any of the links it is merely necessary to remove the cotter pins 35 of the connecting pins 20 which join the links which are to be removed and the sections 21 and 22 can then be pulled apart to effect the separation of the links. By making the link sections as above described and providing them with the recesses 19 and 19ª and also by making the connecting pins 20 in the manner above set forth, the connecting pins will be locked against rotation or distortion relatively to the links 12 and the links 10 will be free to pivot on the combined cylindrical portions of the sections 21 and 22.

By making a chain of the above construction it will be noted that any of the links can be quickly taken apart and if desired to replace the links having the flights 11ª thereon, these links can be quickly taken out and replaced, or the links can be turned around so as to present their opposite ends to the usual sprockets, since it is well known that the ends which receive the thrust from the sprockets usually wear more quickly than the opposite ends and in this manner the life of the flight links can be lengthened.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A chain including links having registering holes; and connecting pins extending through said holes, certain of the links having portions located at opposite sides of the intervening links and being provided with angular recesses, said connecting pins having angularly extending heads fitting said recesses and being made in readily detachable sections; substantially as described.

2. A chain including links having registering holes; connecting pins extending through said holes, certain of the links having portions located at opposite sides of the intervening links and being provided with recesses, said connecting pins having angularly extending heads fitting said recesses and being made in sections within their lengths, one of said sections having a mortise and the other a tenon fitting within said mortise; and detachable means extending through one of said heads for locking said tenon within said mortise; substantially as described.

3. A chain including links having registering holes; connecting pins extending through said holes, certain of the links having portions located at opposite sides of the intervening links and being provided with recesses, said connecting pins having extended heads fitting said recesses and being made in sections within their lengths, one of said sections having a longitudinal mortise and the other an integral tenon fitting within said mortise, said section including the tenon having recesses spaced apart, the other of said sections having jaws fitting said recesses; and detachable means for locking said tenon within said mortise; substantially as described.

4. A chain including links having registering holes, connecting pins extending through said holes, said connecting pins being made in sections within their lengths, one of said sections having a mortise and the other a central tenon fitting within said mortise, said tenon section having a recess, said mortised section having a jaw fitting into said recess whereby the sections are locked against relative rotation on their axes; and means for securing said sections against relative movement in the direction of their axes; substantially as described.

In testimony whereof I have signed my name to this specification in the presence of two subscribing witnesses.

LEWIS LOMANDO.

Witnesses:
JAMES J. CHARDEAN,
N. W. AREASY.